United States Patent Office 3,424,995
Patented Jan. 28, 1969

3,424,995
POWER SUPPLY SYSTEM WITH AUTOMATICALLY SUBSTITUTED REDUNDANT INVERTER
Michael Parente, Florham Park, N.J., assignor to Bell Telephone Laboratories, Incorporated, Murray Hill, N.J., a corporation of New York
Filed Sept. 16, 1966, Ser. No. 580,098
U.S. Cl. 331—49       8 Claims
Int. Cl. H03b 3/14

ABSTRACT OF THE DISCLOSURE

The inputs of a push-pull main converter and a spare converter are connected in series across a DC source and their outputs are connected in parallel to a common load. The input of the spare converter is short-circuited in response to output from the main converter. The positive feedback drive in the main converter is opposed by a constant back-bias. Upon failure of one transistor in the main converter both transistors are turned off, leaving a low impedance current path, and the short circuit across the spare converter input is removed.

---

This invention relates to power supply systems and more particularly to highly reliable DC to DC power converters.

Electrical power converter circuits are employed in a host of different applications ranging from missile systems to undersea cable systems. The use of such circuits is desirable whenever a direct current supply must be converted to either an alternating current or a direct current of a different voltage. In many of these applications an essential design consideration is reliability of circuit operation.

The exploitation of the transistor has naturally resulted in converter designs of decreased weight, bulk and power consumption. These developments have opened a broad vista of new uses for transistorized converters. Illustratively, DC to DC power converters now find use in undersea cable communications systems. In such a system, it is manifest that reliability is a very important factor in the design considerations. Very often this reliability is obtained by designing with redundant circuit elements so that upon the failure of one element, the presence of the redundant element will insure continuous operation. In many such designs, however, reliability through redundancy is obtained only at the expense of reduced efficiency by virtue of increased power consumption.

Accordingly, it is an object of this invention to provide an improved, reliable power conversion system without any significant concomitant sacrifice in operating efficiency.

In accordance with the principal features of the invention, a pair of converters is arranged so that each of their respective inputs is connected in series with the DC power source and each of their outputs is connected in parallel to a common load. Each converter includes a pair of transistors in a push-pull configuration. Under normal operating conditions, one of the converters functions as a spare standby converter with its input shorted under the control of a transfer circuit while the other main unit supplies the load. Upon the occurrence of a transistor failure in the main unit, both transistors therein are biased OFF, a low impedance across the input of the main converter permits power to be applied to the input of the standby converter, and the transfer circuit removes the short from the input of the standby unit to permit it to take up the load. This arrangement not only provides an inherent reliability due to the redundancy described but also operates without a sacrifice in efficiency since only one converter at a time is energized to supply power to the load. Furthermore, a negative feedback network in each converter operates in response to a failure of any one transistor to bias both transistors OFF so as to preclude further oscillations. Such deactivation insures that no unwanted harmonics are introduced into the transmission path should a transistor failure occur. A Zener diode connected across the input in each push-pull converter unit provides both the input voltage to the converter and a portion of the referred to low impedance path for the transmission of power to the other converter unit.

The referred to transfer circuit includes a switching transistor with its emitter-collector terminals connected across the input of the auxiliary converter. During normal operation the switching transistor is forward biased by a rectified AC voltage derived from the master unit. Upon the failure of the master unit, this forward bias is removed and the switching transistor is back biased so that the impedance presented between the emitter-collector electrodes approaches an open circuit. The effect is to remove the short existing across the input of the spare converter and to thereby permit it to supply the load.

A more complete understanding of the invention including its objects and features may be obtained by a consideration of the following detailed description when read in connection with the attached drawing in which.

Figure 1:
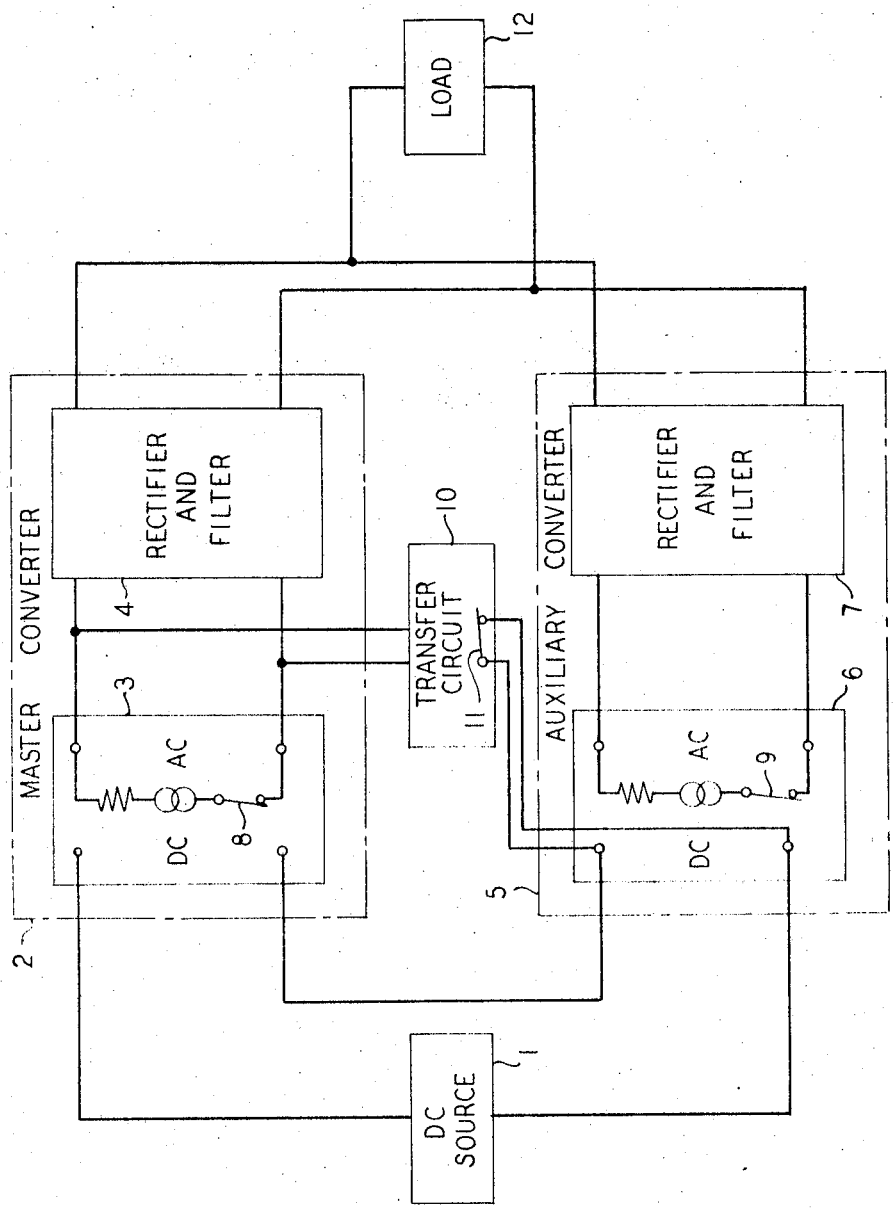
FIG. 1 is a block diagram showing the essential elements of the invention.

The block diagram of FIG. 1 is a functional representation of the essential elements of the invention. A master converter 2 and an auxiliary converter 5 are shown connected between DC source 1 and load 12. Each converters includes a DC to AC inverter section and a rectifier and filter section. The respective inputs to converters 2 and 5 are serially connected with the DC source 1 while the respective converter outputs are connected in parallel with load 12. A transfer circuit 10 monitors the output of inverter 3 within master converter 2 to control the input terminals of inverter 6 in auxiliary converter 5.

This control is symbolically represented by switch 11 which applies either a short or an open circuit to and across the input terminals of inverter 6. The transformation of DC energy to AC energy by each inverter is represented functionally by the AC source symbol in series with an output resistance. Symbolic switches 8 and 9 are shown in series with each of these symbolic AC sources in the respective inverters 3 and 6. These switches function to disconnect the AC source from the remainder of the circuitry upon the failure of an associated inverter transistor. Thus, for example, upon the failure of a transistor within inverter 3, switch 8 opens to disconnect the AC source and deactivate converter 2 so that no energy flows from inverter 3 back to the DC source 1 or forward to load 12.

During normal operation switch 11 is closed so that the input to inverter 6 is shorted. Energy from DC source 1 is converted by master converter 2 to DC at a different voltage level for consumption in load 12. Upon the failure of a transistor in inverter 3, switch 8 opens to deactivate converter 2 and transfer circuit 10 functions to effect the opening of switch 11 so that the short across the input terminal of inverter 6 is removed. Thereupon, energy from DC source 1 is converted by auxiliary converter 5 to the required DC voltage level for consumption in load 12. Switch 9 in inverter 6 remains closed until a failure of a transistor therein whereupon it will open in the same manner described in connection with switch 8 of inverter 3.

Figure 2:
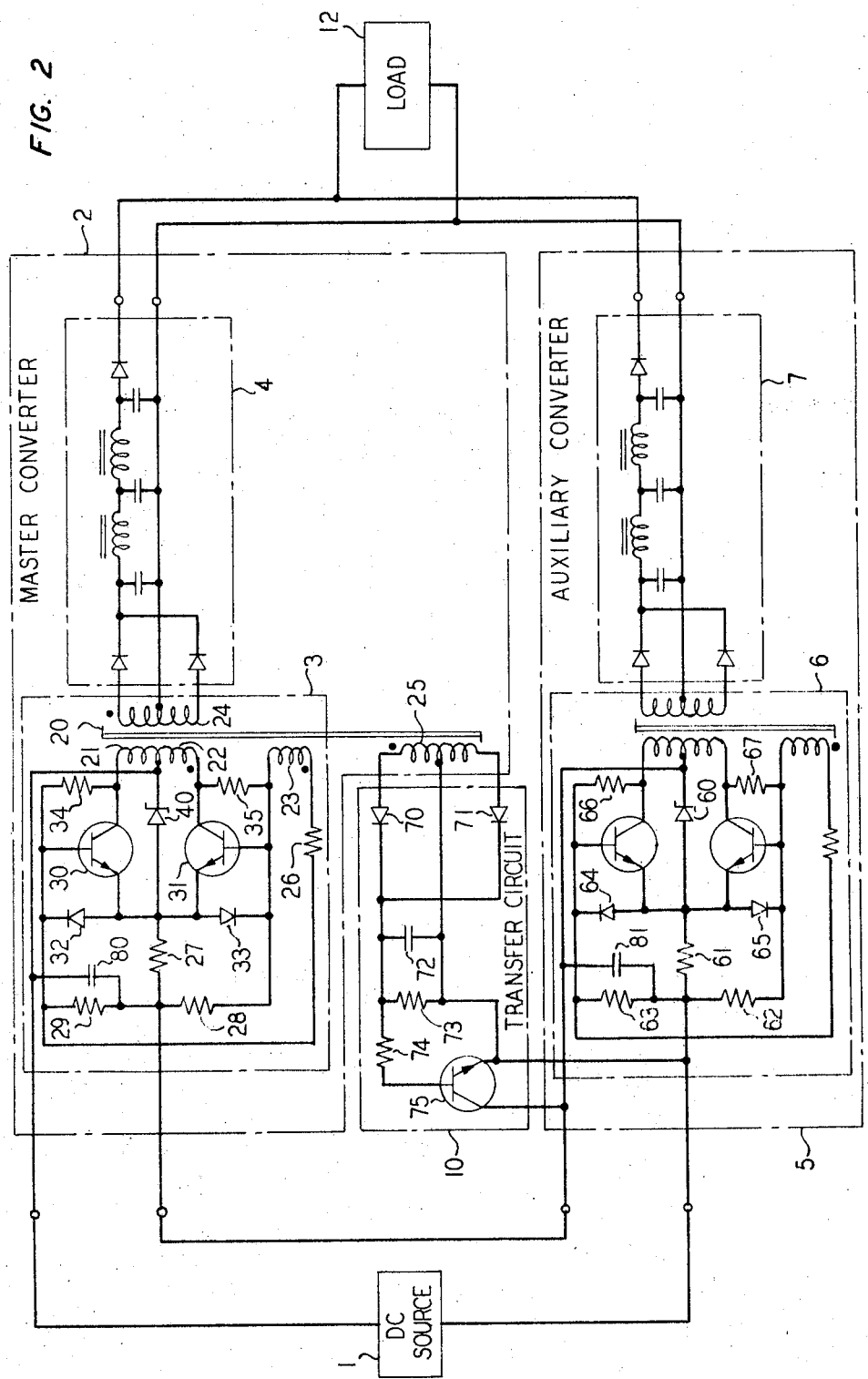
FIG. 2 is a schematic drawing of an embodiment of the invention.

FIG. 2 is a schematic representation of one embodiment of the invention. The various blocks shown in FIG. 1 are repeated with the same numerical designations as in FIG. 2. Thus master converter 2 contains a rectifier and filter unit 4 and inverter 3. Inverter 3 includes a pair of transistors 30 and 31 arranged for push-pull operation. The design and operation of inverter 3 is similar to that described in Patent 3,230,476, granted on Jan. 18, 1964, to R. P. Massey, except that a saturating transformer 20 is used to determine the frequency of oscillation instead of a frequency determining network in the base feedback path. The driving voltage for the inverter is derived from the voltage across Zener diode 40 which is connected in series with DC source 1. A filter capacitor (e.g., capacitor 80 or 81) may also be connected across the input terminals of each converter. Inverter 3 also includes saturable transformer 20 having a center tapped winding with portions designated as 21 and 22, a feedback winding 23, a center tapped output winding 24 and a control winding 25.

As described in the referred to Massey patent, the inverter effects a transformation of the DC input voltage appearing across Zener diode 40 into an AC output voltage across winding 24 by alternately switching the DC input voltage through transistors 30 and 31 to winding portions 21 and 22, respectively. Winding 23 provides a positive feedback to the base circuit of each transistor to provide the base drive necessary for sustained oscillations. While the switching frequency of the instant invention is determined by the saturation characteristics of transformer 20, it could just as easily be determined (as in the above referred to Massey patent) by a frequency selective network included in series with the feedback winding 23. Illustratively, when the dotted terminals of each of the windings are positive transistor 30 will be ON, transistor 31 will be OFF and winding 23 is providing the bias current for transistor 30 via the feedback path which includes winding 23, current limiting resistor 26, base-emitter junction of transistor 30 and diode 33. A more complete description of the circuit operation can be found in the above referred to Massey patent.

The functional representation of switch 8 shown in FIG. 1 is embodied schematically in FIG. 2 by a negative feedback circuit which includes resistors 27, 28 and 29. In the absence of this feedback network, a failure of one transistor in inverter 3 does not insure that the other transistor and supporting circuitry will not function as a single-ended blocking oscillator providing undesirable harmonics. The negative feedback network provides a turnoff signal to both inverter transistors to insure that such unwanted oscillations will not occur after any one such transistor has failed. Under normal operating conditions, the current from DC source 1 flows through the series circuit which includes Zener diode 40, resistor 27 and the collector-emitter terminals of transistor 75. The current from source 1 manifests itself as a DC voltage developed across resistor 27 having a polarity which, by itself, would tend to impose a back bias voltage upon the base-emitter junctions of transistors 30 and 31. By properly selecting the value of resistors 27, 28 and 29 this back bias voltage will, however, be insufficient to overcome the forward base drive supplied from feedback winding 23 while inverter 3 is functioning normally. The value of resistor 27 is further limited by the requirement that upon a failure of either of transistors 30 or 31 the voltage developed across resistor 27 must produce a reverse current through the base-emitter junction of either transistor sufficient to overcome the reduced forward biased current supplied from feedback winding 23. So defined, the value of resistor 27 will generally be on the order of a few ohms and not present a significant impedance in the input power path of converter 5 after a failure in converter 2. Illustratively, if transistor 30 in inverter 3 should fail, resistor 27 functions as a voltage source to deliver current through diode 33 and resistor 28 to back bias transistor 31. Similarly, the voltage across resistor 27 acts to supply current through the series circuit including diode 32 and resistor 29 to insure that transistor 30 also remains back biased. Of course, this network would also back bias both of the transistors if transistor 31 failed first. Analogously, the functional representation of switch 9 in converter 5 of FIG. 1 is schematically represented in FIG. 2 by the feedback circuit which includes resistors 61, 62 and 63.

The negative feedback bias circuit symbolized by switch 8 also insures the operation of transfer circuit 10 upon a failure of a transistor in inverter 3. In the absence of such a provision, inverter 3 may operate as a single ended transistor oscillator supplying an AC voltage to winding 25 and prevent the proper operation of transistor switch 75.

Resistors 28 and 29 in addition to being part of the negative feedback circuit described also function as part of the starting circuit for inverter 3. When the circuit is energized by an initial connection to DC source 1 a forward biasing voltage is applied to the base-emitter junctions of the transistors in inverter 3 before the breakdown voltage of Zener diode 40 is exceeded. For example, forward bias is applied to transistor 31 via the path which includes winding 22, resistor 35 and resistor 28. By symmetry resistors 29 and 34 perform an identical function in inverter 3 as that described for resistors 28 and 35. Similarly, resistors 63 and 66 and resistors 62 and 67 in inverter 6 also exist to perform the starting function described.

When the circuit is operating normally with no transistors having failed, the operation of inverter 3 provides an AC voltage across centertapped winding 25 of transformer 20 for application to transfer circuit 10. This voltage is rectified by diodes 70 and 71, filtered by capacitor 72 and resistor 73 and applied through current limiting resistor 74 to the base-emitter junction of transistor 75. This rectified and filtered voltage derived from inverter 3 in master converter 2 functions to forward bias the base-emitter junction of transistor 75 to insure a very small impedance between the collector and emitter electrodes thereof. This corresponds to the closed condition of switch 11 of FIG. 1 and the maintenance of a short across the input terminals of converter 5 (i.e., across the series circuit including Zener diode 60 and resistor 61).

Upon the occurrence of a failure of either of transistors 30 or 31, inverter 3 ceases to oscillate (by vitue of the described negative feedback network which includes resistors 27, 28 and 29) and the AC voltage across winding 25 is reduced to zero. This in turn effects a removal of forward bias from the base-emitter junction of transistor 75. Consequently, the collector-emitter junction of transistor 75 will now appear as an open circuit across the input terminals of converter 5 and symbolic switch 11 in FIG. 1 will be in its open state. The existence of Zener diode 40 and resistor 27 provides a low impedance path from the DC source 1 to the input of auxiliary converter 5 for the application of power thereto. Upon the subsequent occurrence of a transistor failure in inverter 6, the transistors therein will cease to oscillate by virtue of the negative feedback circuits which includes resistors 61, 62 and 63 in a manner described above, and no power will be supplied to the load 12. Zener diode 40 with resistor 27 and Zener diode 60 with resistor 61 provide a low impedance path for other circuits on the line when both converters 2 and 5 have failed.

Under normal operating conditions with master converter 2 energized and the input to auxiliary converter 5 shorted, DC power from source 1 is converted to the desired level by converter 2 for application in load 12. The conversion is effected only after the intermediate transformation by inverter 3 to an AC voltage which appears across centertapped output winding 24. This AC voltage is of course rectified and filtered in accordance with techniques familiar to those versed in the art. Similarly, a rectifier and filter 7 associated with auxiliary converter 5 changes the AC voltage derived from inverter 6 to a DC voltage for application to load 12. The outputs from the respective converters 2 and 5 are connected in parallel to the common load 12. Eeach of the filter and rectifier units 4 and 7 contain diodes which prevent the output from one unit from being fed into the other. It must also be noted that the respective nevative feedback circuits symbolized by switches 8 and 9 in FIG. 1 prevent unwanted oscillatory modes either from being fed back into the DC source 1 or forward to load 12. Furthermore, while a single power conversion system in the form of master converter and auxiliary converter 5 with transfer circuit 10 is shown, it is to be understood that DC source 1 may supply additional similar units serially connected with the one shown.

By providing a power conversion system with the redundancy described, a high degree of reliability is obtained without a concomitant sacrifice in efficiency or unit life. Thus, only one converter (the master unit) operates to supply load 12 from DC source 1 until a transistor failure in the master converter activates the transfer circuit. Thereupon the standby converter automatically becomes activated and continues to uninterruptedly supply power. Therefore, no power is wasted in maintaining the spare auxiliary converter in an energized state during the time it is not needed in the circuit. By operating in this fashion, not only is the overall circuit's efficiency increased, but the lifetime of the entire power conversion system is extended since the elements in auxiliary converter 5 are not being used until a failure occurs in master converter 2.

It is to be understood that the above-described arrangements are illustrative of the application of the principles of the invention. Numerous other arrangements may be devised by those skilled in the art without departing from the spirit and scope of the invention.

What is claimed is:

1. An inverter circuit for developing an alternating current output from a direct current source comprising a pair of transistors connected in a push-pull configuration to draw current alternately from said source, a positive feedback circuit connected to provide a forward bias drive to said transistors to maintain said inverter in self-sustained oscillatory mode, a bias resistor connected in series with said direct current source to provide a substantially constant voltage of opposite polarity and lower magnitude than said forward bias drive, and means connecting said bias resistor in parallel with said positive feedback circuit, whereby said transistors are back-biased in response to a substantial reduction in said forward bias drive.

2. An inverter circuit in accordance with claim 1 further comprising a transformer having a centertapped primary winding, an output winding and a feedback winding, said transistors having base, collector and emitter electrodes, said emitter electrodes being interconnected, each of said collector electrodes being connected to different ends of said primary winding, a breakdown diode connected between said center tap and said interconnected emitters, means for further connecting said base electrodes to different ends of said feedback winding in a positive feedback connection, and wherein said means connecting said bias resistor in parallel with said positive feedback circuit includes a pair of resistors serially connected between each of said base electrodes and said bias resistor is connected between the junction of said pair of resistors and said interconnected emitter electrodes.

3. An inverter circuit in accordance with claim 2 wherein a diode is connected between the base and emitter electrodes of each of said transistors, a starting resistor is connected between the base and collector electrodes of each of said transistors and wherein said DC source is connected serially with said breakdown diode and said bias resistor.

4. A power conversion system interposed between a signal source and a load comprising a master and an auxiliary converter each having input and output terminals, each of said converters being responsive to the application of said signal source to its input terminals to produce a signal of a different magnitude at its output terminals, means for serially connecting the respective converter input terminals with said source, means for connecting the respective converter output terminals in parallel with said load, means individual to each converter for effecting a complete deactivation thereof upon the occurrence of a failure therein, and a transfer circuit including a normally shorted switch connected across the input terminals to said auxiliary converter and means for opening said switch upon the occurrence of a failure in said master converter.

5. A power conversion system in accordance with claim 4 wherein each of said converters includes a free-running push-pull transistor inverter circuit having a positive feedback loop connected as a driving circuit and providing a turn-off signal in said drive circuit sufficient to sustain oscillations, and wherein said converter deactivation means includes a negative feedback circuit connected to said driving circuit, said negative feedback circuit providing a turn-off signal in said drive iiriuit sufficient to overcome said driving signal upon the failure of an inverter transistor.

6. A power conversion system in accordance with claim 5 wherein said transfer circuit includes a transistor switch having a main current path connected across said input terminals of said auxiliary converter, and means responsive to oscillations generated by said inverter portion of said main converter for maintaining a forward bias on said transistor to effect a low impedance in said main current path.

7. A power conversion system in accordance with claim 6 wherein said signal source includes a DC component, each of said inverters includes a pair of transistors each of which having emitter, collector and base electrodes, said transistors being connected in a push-pull arrangement with interconnected emitter electrodes, each of said inverters includes a transformer having an output winding, a centertapped primary winding and a feedback winding, each end of said primary winding being connected to different collector electrodes of each of said inverter transistors, said feedback winding being connected between the respective base electrodes of each of said inverter transistors, each of said inverters having a breakdown diode connected between said primary winding center tap and the junction of said interconnected emitter electrodes and wherein said negative feedback circuit includes a pair of resistors serially connected between base electrodes of each of the inverter transistors and a third resistor connected between the junction of said pair and said interconnected emitter electrodes, said converter input terminals comprising said primary winding center tap and the junction of said pair of resistors.

8. A power conversion system in accordance with claim 7 wherein a rectifier and filter is interconnected between said load and the output winding of each of said inverter transformers, said transistor switch in said transfer circuit has base, emitter and collector electrodes, said main current path includes said collector and emitter electrodes, the inverter transformer in said main converter has a fourth winding, and wherein said transfer circuit further includes a rectifier and filter interconnected between said fourth winding and the base and emitter electrodes of said transistor switch.

References Cited

FOREIGN PATENTS 815,668    7/1959    Great Britain.

JOHN KOMINSKI, *Primary Examiner.*

U.S. Cl. X.R.

331—113.1, 62, 56, 185; 307—64; 178—50; 179—15; 328—224; 343—204